United States Patent
Motosko et al.

(10) Patent No.: US 10,718,116 B2
(45) Date of Patent: Jul. 21, 2020

(54) ROLL SHUTTER, AWNING AND BLINDS HOOD

(71) Applicants: Stephen J. Motosko, Sarasota, FL (US); Stephen J. Motosko, III, Sarasota, FL (US); Catherine Motosko, Sarasota, FL (US)

(72) Inventors: Stephen J. Motosko, Sarasota, FL (US); Stephen J. Motosko, III, Sarasota, FL (US); Catherine Motosko, Sarasota, FL (US)

(*) Notice: Subject to any disclaimer, the term of this patent is extended or adjusted under 35 U.S.C. 154(b) by 0 days.

(21) Appl. No.: 15/428,505

(22) Filed: Feb. 9, 2017

(65) Prior Publication Data

US 2017/0226745 A1   Aug. 10, 2017

Related U.S. Application Data

(60) Provisional application No. 62/293,177, filed on Feb. 9, 2016.

(51) Int. Cl.
| | |
|---|---|
| *G03B 21/00* | (2006.01) |
| *E06B 9/56* | (2006.01) |
| *E04F 10/06* | (2006.01) |
| *E06B 9/17* | (2006.01) |
| *B29L 31/00* | (2006.01) |
| *B29C 53/04* | (2006.01) |
| *B29C 53/06* | (2006.01) |

(52) U.S. Cl.
CPC ........ *E04F 10/0685* (2013.01); *E06B 9/1703* (2013.01); *E06B 9/17015* (2013.01); *E06B 9/17023* (2013.01); *B29C 53/04* (2013.01); *B29C 53/06* (2013.01); *B29L 2031/719* (2013.01)

(58) Field of Classification Search
CPC .. E04F 10/0685; E04F 10/0688; B29C 53/06; B29C 53/04; B29C 53/043; B29C 53/38; E06B 9/42; E06B 9/17023; E06B 9/1703; E06B 9/17015; B65D 5/42; B65D 5/4204; B29L 2031/719
See application file for complete search history.

(56) References Cited

U.S. PATENT DOCUMENTS

| | | | | |
|---|---|---|---|---|
| 1,836,548 A | * | 12/1931 | Osborn | E04F 10/0618 160/22 |
| 3,907,193 A | * | 9/1975 | Heller | B29C 53/063 428/156 |
| 4,220,189 A | * | 9/1980 | Marquez | E06B 9/17076 160/23.1 |
| 4,241,745 A | * | 12/1980 | Knox | E04H 15/00 135/100 |
| 4,725,463 A | * | 2/1988 | Baumber | E04C 3/28 138/121 |

(Continued)

*Primary Examiner* — Daniel P Cahn
(74) *Attorney, Agent, or Firm* — Varnum, Riddering, Schmidt & Howlett LLP

(57) ABSTRACT

A hood for a roll up shutter is provided wherein the hood configured to be transported in a flat or rolled up configuration and assembled upon delivery. The hood includes a sheet having a first surface and a second surface and at least one indentation formed on at least one of the first surface or the second surface, the indentation configured to facilitate bending at the at least one indentation wherein after delivery, the sheet is bent at the at least one indentation so as to form the hood.

9 Claims, 3 Drawing Sheets

(56) References Cited

U.S. PATENT DOCUMENTS

| | | | | |
|---|---|---|---|---|
| 4,953,735 | A * | 9/1990 | Tisbo | B65D 1/225 |
| | | | | 138/156 |
| 5,001,875 | A * | 3/1991 | Cacioppo | E04B 7/026 |
| | | | | 52/201 |
| 5,458,942 | A * | 10/1995 | Miller | B29C 63/22 |
| | | | | 256/19 |
| 5,514,432 | A * | 5/1996 | Lisec | E06B 3/66314 |
| | | | | 248/208 |
| 6,336,616 | B1 * | 1/2002 | Lin | G03B 21/58 |
| | | | | 248/222.11 |
| 6,873,461 | B1 * | 3/2005 | McPherson, Jr. | E06B 9/50 |
| | | | | 160/23.1 |
| 2005/0206181 | A1 * | 9/2005 | Sagi | B60R 9/055 |
| | | | | 296/37.7 |
| 2006/0087113 | A1 * | 4/2006 | Snyder | B42D 5/026 |
| | | | | 283/106 |
| 2014/0261846 | A1 * | 9/2014 | Lanciaux | B29D 23/001 |
| | | | | 138/141 |
| 2015/0233140 | A1 * | 8/2015 | Kelly | E04H 17/003 |
| | | | | 256/12 |
| 2017/0226745 | A1 * | 8/2017 | Motosko | E04F 10/0685 |
| 2018/0094476 | A1 * | 4/2018 | Briese | E06B 3/67313 |

* cited by examiner

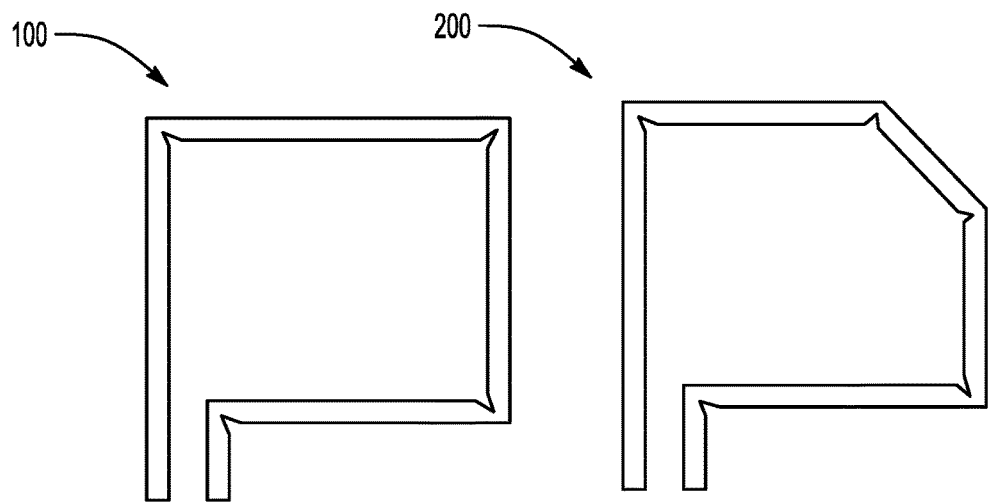
*Fig-7*  *Fig-8*
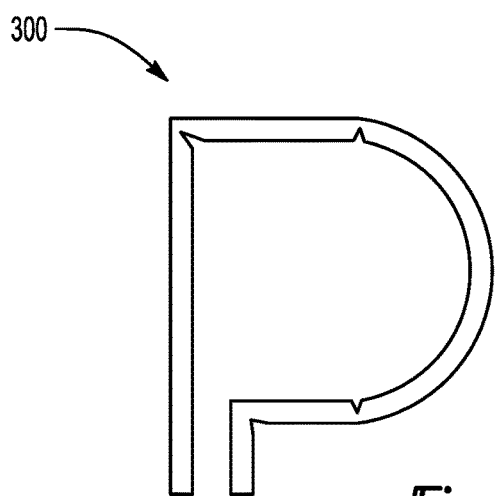
*Fig-9*
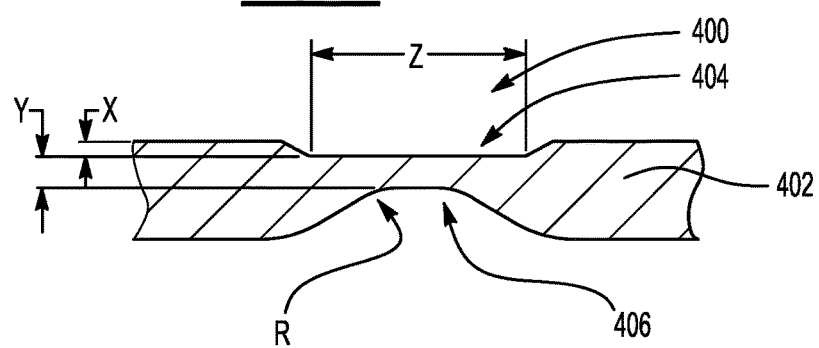
*Fig-10*

ROLL SHUTTER, AWNING AND BLINDS HOOD

CROSS-REFERENCE TO RELATED APPLICATIONS

This application claims priority of U.S. Provisional Patent Application Ser. No. 62/293,177 filed Feb. 9, 2016, which is incorporated herein by reference.

TECHNICAL FIELD

The present specification generally relates to a hood for a shutter, awning and/or blinds and, more specifically, to a hood for a shutter, awning and/or blinds for purposes of covering an opening of a building for storm protection purposes.

BACKGROUND

Manufacturers of various types of roll shutters, blinds, etc. can buy long rolls of pre-shaped material (650 feet being a standard coil), cut off the exact length for the custom shutter they are building and simply bend on the flexible hinges. The hood can be shipped installed on the shutter or rolled up the short way and shipped in a separate box. The nature of the plastic material makes it far less susceptible to damage during transport and/or installation and cumbersome to ship and transport because of the large size.

Accordingly, a need exists for alternative hood for a shutter, awning and/or blinds configured to transport easily.

SUMMARY

In one embodiment, a hood for a roll up shutter including a generally planar sheet configured to be rolled, the sheet roller for transportation purposes, the sheet having a first surface and an opposed second surface, at least one notch formed in either the first surface or the second surface and wherein after transportation, the sheet is configured to be unrolled and bent at the at least one notch to thereby form a hood configured to connect directly to the exterior of a building.

In another embodiment, a hood for a roll up shutter is provided wherein the hood configured to be transported in a flat or rolled up configuration and assembled upon delivery. The hood includes a sheet having a first surface and a second surface and at least one indentation formed on at least one of the first surface or the second surface, the indentation configured to facilitate bending at the at least one indentation wherein after delivery, the sheet is bent at the at least one indentation so as to form the hood.

In yet another embodiment, a method is provided to manufacture and assemble the hood as outlined herein.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 7 depicts a cross-sectional view of one embodiment of the hood according to one or more embodiments shown and described herein;

FIG. 8 depicts a cross-sectional view of an alternative embodiment of the hood according to one or more embodiments shown and described herein; and FIG. 9 depicts a cross-sectional view of yet another alternative embodiment of the hood according to one or more embodiments shown and described herein; and FIG. 10 depicts a cross sectional view of a hinge according to one of more embodiments shown and described herein.

DETAILED DESCRIPTION

Figure 1:
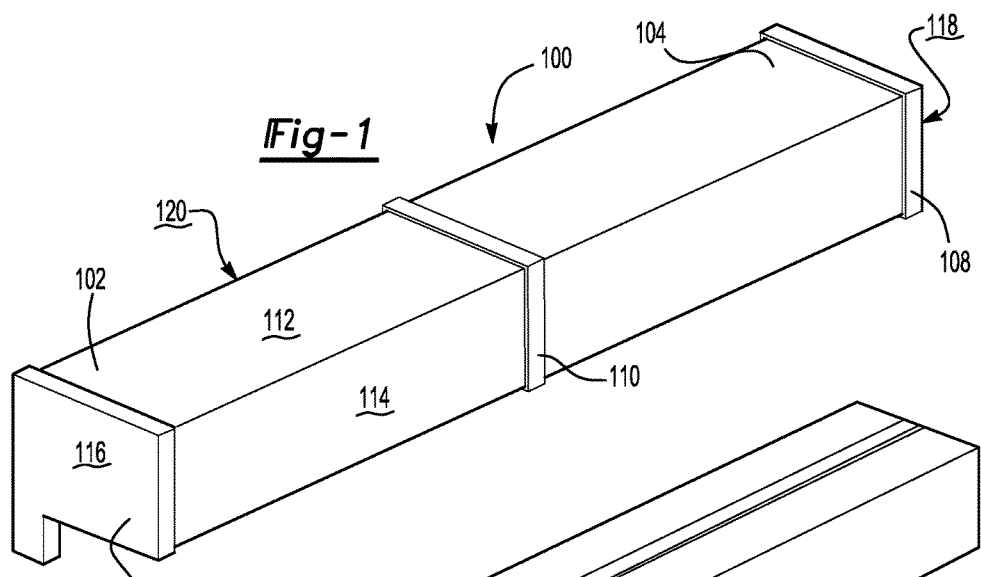
FIG. 1 depicts an assembled perspective view of the hood according to one or more embodiments shown and described herein.

FIG. 1 generally depicts one embodiment of a hood for a roll up shutter including a generally planar sheet configured to be rolled, the sheet roller for transportation purposes, the sheet having a first surface and an opposed second surface, at least one notch formed in either the first surface or the second surface and wherein after transportation, the sheet is configured to be unrolled and bent at the at least one notch to thereby form a hood configured to connect directly to the exterior of a building. The notch may also be referred to as an indentation, bend locations, hinge and/or flexible hinge. These terms may be and are used interchangeably here. Flexible hinges allow for hood to be rolled reducing shipping sizes, shipping costs and reducing damage during shipping and installation.

Generally, a hood 100 is provided to provide a thermal barrier to provide protection for the heat and other natural elements. The hood 100 is less expensive and yields less damages as compared to pre-assembled hood assemblies. The plastic hood serves to enclose and protect the product it is covering, such as blinds, roll shutters, security roll shutters, awnings, etc. from rain, snow, leaves, debris, sun fading, damage, vandalism etc. The plastic hood also provides a thermal barrier against high temperature that can heat up and damage the contents of the hood as well as the surface it is mounted to.

Referring now to FIG. 1, a hood 100 is provided having a first end 102 and an opposed second end 104. The first end 102 include an end cap 106. Similarly, the second end 104 includes an end cap 108. The end cap 106 includes an outer surface 116 and is configured to connect to the assembled hood assembly. The end cap 108 includes an outer surface 118 and is configured to connect directly to the assembled hood 100. In the present embodiment, the end caps 106, 108 are snapped into place on the hood 100. In other embodiments, the end caps 106, 108 are fastened, bolted, screwed or otherwise attached to the hood 100.

The hood 100 may further include the support brace 110. The support brace 110 is configured to wrap around the outer surfaces 112, 114, 120 of the hood 100.

Figure 2:
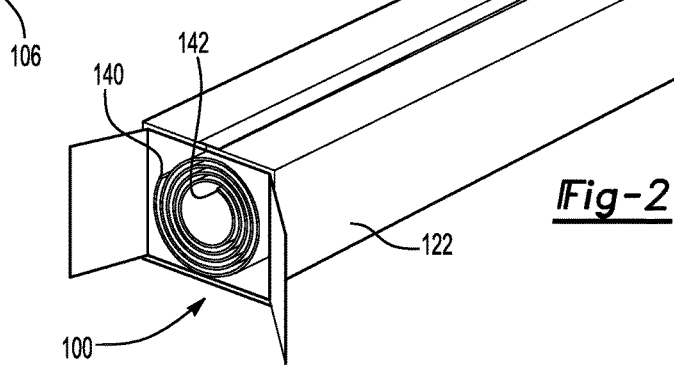
FIG. 2 depicts a perspective view of a rolled up pre-assembled hood in transport according to one or more embodiments shown and described herein.

Referring now to FIG. 2, the hood 100 is illustrated in a rolled up configuration and inserted into a packaging box. This illustration illustrates the small nature of the hood during transportation which is why the present specification is particularly advantageous. The hood 100 is illustrated rolled up and having the first end 140 and the second end 142.

Figure 3:
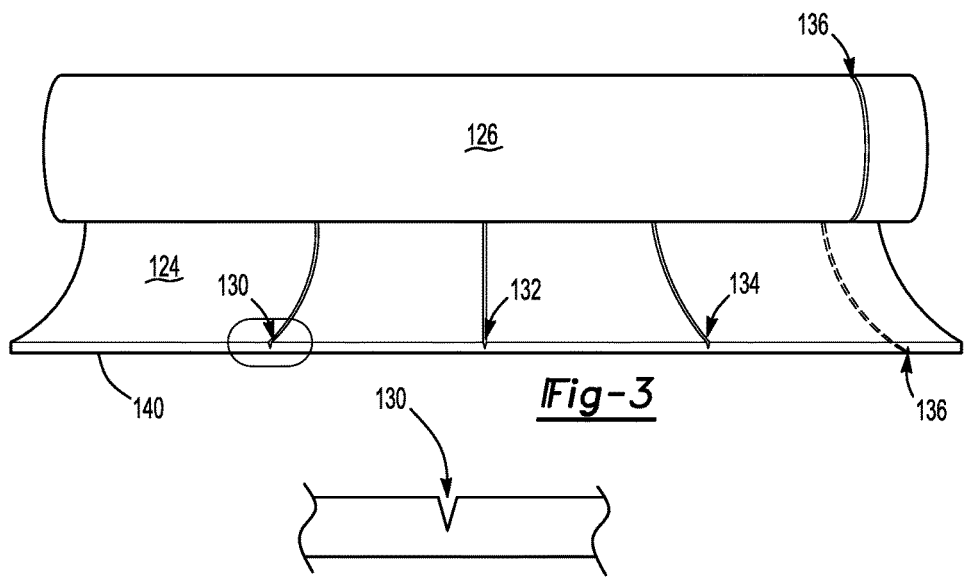
FIG. 3 depicts a front view of a partially unrolled up pre-assembled hood according to one or more embodiments shown and described herein.
Figure 4:
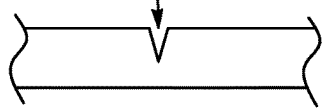
FIG. 4 depicts a partial side view of the circled area as shown in FIG. 3 illustrating the notched/intended portion configured to facilitate bending of the sheet according to one or more embodiments shown and described herein.

Referring now to FIG. 3, the hood 100 is illustrated in a partially unrolled position. The hood 100 is showing having the first end 140 (and the hidden second end 142). The hood 100 includes the first surface 124 and the opposed second surface 126. In this embodiment, the first surface 124 includes 3 notches 130, 132, 134. The opposed second surface 126 includes the notch 136. These notches may also be referred to as an indentations, bend locations, hinges and/or flexible hinges. These terms may be and are used interchangeably here. Flexible hinges allow for hood to be rolled reducing shipping sizes, shipping costs and reducing damage during shipping and installation.

In some embodiments, the notches are more like hinges and include a notched portion on either side. This embodiment is illustrated in FIG. 10. In this embodiment, a first surface includes a first indentation 404. A second surface includes a second indentation 406. These indentations 404, 406 are positioned adjacent to each other to further weaken the sheet of the hood 100 so as to easily facilitate bending. This embodiment may also be referred to as the flexible hinge design. In this embodiment, the distance Y is approximately 0.012 inches. This distance may vary depending on the thickness of the sheet. The distance X ranges between 0.005-0.05. The radius R may range from 0.010-0.050 in. The distance Z may be anywhere between 0.01-1.5 inches.

Generally, in all embodiments, the notches will extend at least 40% into the depth of the sheet. This is clearly illustrated in the attached photographs. Even the lower indentation of FIG. 10 extends at least 40% of the depth into the sheet 400.

Figure 5:
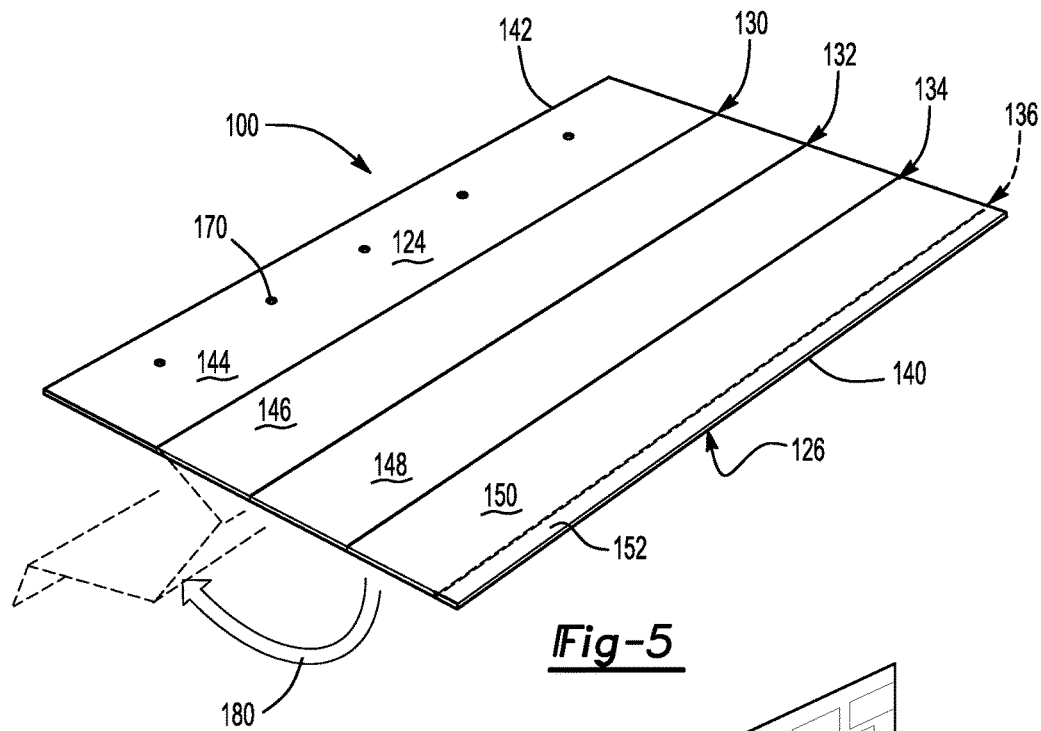
FIG. 5 depicts a perspective view of the sheet with a phantom view illustrating bending of the sheet according to one or more embodiments shown and described herein.

Referring now to FIG. 5, the sheet 100 includes a plurality of sections 144, 146, 148, 150, 154. The sections 144, 146, 148, 150, 154 of the sheet may be a one piece formation or several portions molder or otherwise connected together. The sections 144, 146, 148, 150, 154 are connected at the notches 130, 132, 134, 136 and configured to bend at these notches 130, 132, 134, 136. As illustrated by movement arrow 180, the sheet bends to form the hood 100, such as illustrated in the preceding figures. The formed hood is configured to hold and shield a roll up share 154 having.

Figure 6:
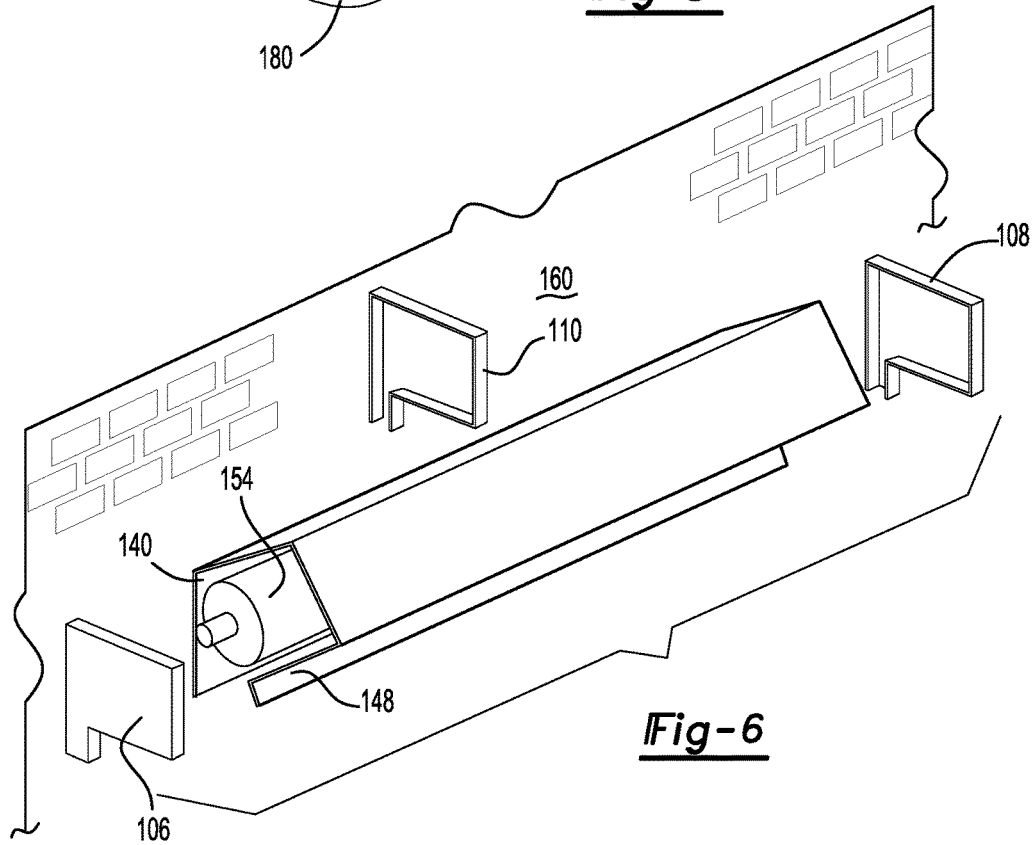
FIG. 6 depicts a partially exploded perspective view of the hood according to one or more embodiments shown and described herein.

The hood 100 is configured to mount directly to the exterior of a building 160, such as illustrated in FIG. 6. The hood 100 is preferably mounted above a window or other opening so as to position the roll up shade over the opening thereby allowing the shutter or shade to cover the window or building opening when in use.

The hood 100 can be made of a one-piece or multiple-piece design. This flexible hinge design can be extruded into the flat or partially formed extruded plastic sheet. Flexible hinges can be spaced to align with various end cap styles and sizes, for example, an 8" square cap (such as depicted in FIG. 6).

A roll of flat extruded sheet can also be cut to a hinge design with a router, saw, other cutting device, compression rollers or heated compression rollers. The flexible hinge can also be created by compressing the plastic between rollers shaped like the inverse of a flexible hinge. The rollers can also be heated to help set the plastic. The width of the sheet and the spacing of the flexible hinges will be determined based on the end cap size and shape.

There are three (3) popular shapes: square as illustrated in FIGS. 7-9: square, 45 degrees and round This new hood can be extruded in a flat or pre-bent shape and rolled up by the width. For example, a 25-foot hood rolls up to approximately 32 inches for shipping and now a much smaller box can be used saving the expense of shipping a 25-foot box.

Manufacturers and installers of various types of roll shutters, blinds, awnings etc. can buy these long rolls of pre-shaped material (650 feet being a standard length coil), cut off the exact length for the custom shutter they are building and simply bend on the flexible hinges. The hood can be shipped installed on the shutter or rolled up the short way and shipped in a separate box). The nature of the plastic material makes it far less susceptible to damage during transport and/or installation. In addition, plastic can be dented, bent or twisted during shipping or installation and bounce back to its original shape; whereas once aluminum is bent, dented or twisted, it is no longer able to be used.

The plastic material such as PVC, Polypropylene and poly-carbonate do not transfer heat like aluminum, nor does it oxidize like aluminum. Pre-colored plastic does not show scratches since the color is throughout the material and it never needs to be repainted. There is also a cost savings using plastic rather than aluminum as the base material.

Standard end caps can be used simply by adhering the plastic using screws or rivets. Intermediary brackets may be used to help maintain the desired hood shape on longer hoods. Intermediary brackets can be shaped like the cross section of the corresponding end cap. They can be spaced as necessary to give the hood better form.

The round end cap hood can simply be formed with flexible hinges for the corners and no need to roll form the center section. The plastic will automatically contour to the shape of the end cap and intermediary brackets. The last edge can be hemmed, attached using a pre-formed flexible 360 hinge and welded, or an extra piece of aluminum can be added and riveted or welded together. The installer can simply unroll the hood and bend it to the predetermined shape for installation.

The hood of the present specification is associated with a particular method of manufacture and assembly. The hood can be made of a one-piece or multiple-piece design. This flexible hinge design can be extruded into the flat or partially formed extruded plastic sheet. Flexible hinges can be spaced to align with various end cap styles and sizes, for example, an 8" square cap. A roll of flat extruded sheet can also be cut to a hinge design with a router, saw, other cutting device, compression rollers or heated compression rollers. The flexible hinge can also be created by compressing the plastic between rollers shaped like the inverse of a flexible hinge. The rollers can also be heated to help set the plastic. The width of the sheet and the spacing of the flexible hinges will be determined based on the end cap size and shape.

The hood can be made of a one-piece or multiple-piece design. This flexible hinge design can be extruded into the flat or partially formed extruded plastic sheet. Flexible hinges can be spaced to align with various end cap styles and sizes, for example, an 8" square cap. A roll of flat extruded sheet can also be cut to a hinge design with a router, saw, other cutting device, compression rollers or heated compression rollers. The flexible hinge can also be created by compressing the plastic between rollers shaped like the inverse of a flexible hinge. The rollers can also be heated to help set the plastic.

Intermediary brackets can be shaped like the cross section of the corresponding end cap. They can be spaced as necessary to give the hood better form. The round end cap hood can simply be formed with flexible hinges for the corners and no need to roll form the center section. The plastic will automatically contour to the shape of the end cap and intermediary brackets. The last edge can be hemmed, attached using a pre-formed flexible 360 hinge and welded, or an extra piece of aluminum can be added and riveted or welded together.

Is discussed above, intermediately support brackets (such as the bracket referred to at reference numeral 110) may be used to help maintain the desired hood shape on longer hoods. Intermediary brackets can be shaped like the cross section of the corresponding end cap. They can be spaced as necessary to give the hood better form. The round end cap hood can simply be formed with flexible hinges for the corners and no need to roll form the center section.

The plastic will automatically contour to the shape of the end cap and intermediary brackets. The last edge can be hemmed, attached using a pre-formed flexible 360 hinge and welded, or an extra piece of aluminum can be added and riveted or welded together. The installer can simply unroll the hood and bend it to the predetermined shape for installation.

The present specification and hood provides for may unique features overcoming the disadvantages of the prior art including providing the hood with flexible hinges, providing thermal barrier benefits, the ability to roll up into a small shipping box, lower cost of shipping and manufacture, increased resistance to dents, deformation or other damage and allows creative shaping (such as square, round or angled hoods).

The present specification is particularly advantageous in that it produces less waste, lower shipping costs and is less likely to be damaged during installation and shipping. Other advantages include heat reduction due to plastic not transferring heat like alum, non-oxidation, plastic can be pre-colored requiring no painting and does not show scratches.

The hood 100, the present embodiment, is made of a plastic material. In other embodiments, the hood 100 is made of a plastic-like, polymer, polymer-like, metal or any other suitable material having sufficient flexing and bending characteristics. In the present embodiment, unlike aluminum hoods, the plastic material for the hood does not transfer heat like aluminum, nor does it oxidize like aluminum.

It is noted that the terms "substantially" and "about" may be utilized herein to represent the inherent degree of uncertainty that may be attributed to any quantitative comparison, value, measurement, or other representation.

These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination.

It is therefore intended that the appended claims cover all such changes and modifications that are within the scope of the claimed subject matter.

What is claimed is:

1. A hood configured to connect to a building, the hood configured to house a roll up shutter configured to be rolled up and unrolled from within the hood to cover up an opening of the building, and the hood configured to be transported to the building in an unassembled rolled configuration prior to being connected to the building, the hood comprising:
    a sheet configured having a first surface and an opposed second surface, at least one notch formed in either the first surface or the second surface, both the first surface and the second surface being free of any projections or protrusions thereby allowing the sheet to be rolled tightly in the unassembled rolled configuration so as to save space, the sheet configured to move from a first position, to a second position to a final position wherein;
    the first position defined when the sheet is in the unassembled rolled configuration for transportation;
    the second position defined when the sheet is unrolled after transportation; and
    the final position defined when the sheet is bent at the at least one notch so as to form a body of the hood;
    the hood having a top surface, two side surfaces and a bottom surface, a space so as to allow an unrolled section of the roll up shutter to move through the space as the roll up shutter is being rolled and unrolled, so as to allow the roll up shutter to be unrolled therefrom, the hood connectable to the building thereby enabling the roll up shutter to cover a building opening.

2. The hood of claim 1 wherein a second notch is formed on the other of the first surface or the second surface, the second notch directly opposed from the at least one notch.

3. The hood of claim 1 wherein the at least one notch is also a flexible hinge.

4. The hood of claim 1 wherein the at least one notch extends at least 40% into the sheet.

5. The hood of claim 1 further includes at least one end cap, the end cap configured to connect to an end portion of the hood.

6. The hood of claim 1, wherein a cross section of the hood includes at least one rounded portion.

7. The hood of claim 1, wherein a cross section of the hood includes at least one angled portion.

8. The hood of claim 1 wherein the sheet is made of a material configured to act as a thermal barrier to provide protection from the heat.

9. The hood of claim 1 wherein a support bracket is provided at a midsection of the hood to further support the hood, the support bracket configured to connect to the building.

* * * * *